3,183,075
CONTROL OF UNDESIRABLE PLANT GROWTH
Bryant L. Walworth, Pennington, N.J., assignor to American Cyanamid Company, Stamford, Conn., a corporation of Maine
No Drawing. Filed Dec. 3, 1962, Ser. No. 241,570
6 Claims. (Cl. 71—2.6)

The present invention relates to herbicidal compositions. More particularly, the invention relates to herbicidal compositions containing as their active ingredient an $\alpha,\beta$-dihalocinnamic acid derivative having the general formula:

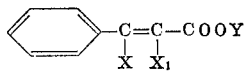

wherein X and $X_1$ are halogen atoms, such as chlorine or bromine, and Y represents a hydrogen, ammonium, an alkali metal or —H·NH (lower alkyl) radical.

Illustrative of the $\alpha,\beta$-dihalocinnamic acid derivatives which can be employed in the present invention, are: $\alpha,\beta$-dichlorocinnamic acid, $\alpha,\beta$-dibromocinnamic acid, and $\alpha$-bromo, $\beta$-chlorocinnamic acid, and the ammonium, sodium, potassium, lithium, methylamine, ethylamine, isopropylamine, n-butylamine and t-butylamine salts of each of the aforementioned acids. Advantageously, the cinnamic acid derivatives employed in the compositions of the present invention can be prepared by any procedure known in the art, as described, for instance, in Berichte, 25, 2664 (1892), Berichte, 46, 1249 (1913), and Journal Chemical Society, 2979 (1928).

The herbicidal compositions are prepared by admixing the active cinnamic acid compound with an inert carrier of the type or kind generally referred to in the art as pest control adjuvants in solid or liquid form. Typical carriers include clays, pumice, silica, chalk, diatomaceous earth, walnut shell flour and talcs.

In general, liquid compositions can be prepared by dissolving the active compound, usually in the form of its alkali metal salt, in water or by initially dissolving the same in commercial organic solvents and then admixing the resultant solutions with water either with or without an emulsifying agent. The cinnamic acid derivatives are soluble in common organic solvents, such as acetone, methyl isobutyl ketone, methyl sulfoxide, xylene, dioxane and isopropyl acetate.

Exemplary of surface active or emulsifying agents are those normally employed in the preparation of oil-in-water emulsions. These include, for instance, non-ionic and ionic emulsifying agents, such as the alkyl aryl sulfonates and polyglycol ethers. The latter are employed in relatively small concentrations, usually in the range of from about 0.1% to 2% by weight of the overall composition.

The cinnamic acid derivatives may be applied either as a spray or as a dust to the locus to be protected from undesirable plant growth. The amount to be applied will vary in the manner and purpose for which the composition prepared from the cinnamic acid derivative is to be employed. Concentrates for subsequent use in preparing spray formulations may contain as much as 90%, or more, of the active ingredient. Sprays or dusts for direct use should be diluted with extenders, in some cases the dilution to be as little as 0.5% of the active ingredient or less.

The invention will be further illustrated by the following examples. These are not to be taken as limitative of the invention. Unless otherwise noted, all parts are by weight.

EXAMPLE 1

This example illustrates the selective post-emergence herbicidal activity of cis-$\alpha,\beta$-dibromocinnamic acid and cis-$\alpha,\beta$-dichlorocinnamic acid by treating a variety of herbicidal activity of cis-$\alpha,\beta$-dibromocinnamic acid and monocotyledonous and dicotyledonous seedling plants with varying concentrations of each of the cinamic acid derivatives named.

In conducting the test, seedlings are grown for about two weeks in flats approximately one square foot in size. sufficient quantities of the several cinnamic acid derivatives are dissolved in a 50/50 acetone/water mixture containing 0.1 part of dodecyl benzene sodium sulfonate to produce concentrations which, when applied to the plants through a spray nozzle operating at 30 p.s.i.g. for a predetermined time, are equivalent to 12.5, 10.0, 5.0 and 2.0 pounds per acre of the test cinnamic acid derivative. The so-treated flats of seedlings are next placed in a greenhouse and examined after two weeks. The results are recorded in Table I below.

Table I

| Test Plant | Herbitoxicity Index* | | | | | | | |
|---|---|---|---|---|---|---|---|---|
| | 12.5 lbs./A | | 10 lbs./A | | 5 lbs./A | | 2 lbs./A | |
| | A | B | A | B | A | B | A | B |
| Pea | 5 | | | | 5 | | 5 | |
| Wheat | 1 | 1 | | | 1 | | 0 | |
| Radish | 5 | a 3 | | | 4 | | 1 | |
| Tomato | 5 | a 3 | 5 | | 5 | | b 3 | |
| Mustard | | | 5 | | | | 5 | |
| Millet | | | 1 | | | | 0 | |
| Crabgrass | | 1 | 0 | | | | 0 | |
| Bindweed | | b 1 | 5 | | | | 5 | |
| Pigweed | | | 5 | | | | 5 | |
| Wild oats | | | 3 | | | | 0 | |
| Water grass | | | 0 | | | | 0 | | a = Slightly malformed plants.  b = Severely malformed plants.
A = $\alpha,\beta$-dichlorocinnamic acid.  B = $\alpha,\beta$-dibromocinnamic acid.
*Herbitoxicity Index:
 0 = No apparent effect.
 1 = Slight injury.
 2 = Moderate injury.
 3 = Severe injury, no plants killed.
 3+ = Severe injury, up to 50% plants killed.
 4 = Severe injury, 50–75% plants killed.
 4+ = Severe injury, 75–95% plants killed.
 5− = Severe injury, 95–100% plants killed.
 5 = All plants killed.

From a consideration of the above data it is clear that the dicotyledonous plants as illustrated by pigweed and mustard, are completely killed at concentrations as low as 2 pounds per acre, and that at concentrations as high as 12.5 pounds per acre the monocotyledonous plants, as represented by wheat, are substantially uninjured by application of the cinnamic acid derivative employed in the illustrated compositions.

EXAMPLE 2

This example illustrates the pre-emergence herbicidal activity of the several cinnamic acid compounds in the following manner.

Glazed quart crocks are filled to within about two inches of their tops with potting soil. Thereafter, one and one-half inches thoroughly mixed with radish and wheat seeds and a predetermined amount of active cinnamic acid compound are mixed with the potting soil. The crocks are then watered, placed on greenhouse benches and the results of the test are recorded after two weeks. Concentrations of active compound equivalent to 25, 5, 1 and 0.2 pounds per acre are employed in the test for purposes of determining pre-emergence activity. The results obtained are tabularized in Table II below.

Table II

| Test Plant | Herbitoxicity Index* | | | | | | | |
|---|---|---|---|---|---|---|---|---|
| | 25 lbs./A | | 5 lbs./A | | 1 lb./A | | 0.2 lb./A | |
| | A+ | B+ | A+ | B+ | A+ | B+ | A+ | B+ |
| Wheat | a 3 | b 1 | b 1 | a 1 | 0 | | 0 | |
| Radish | 5 | 5 | 5 | 4 | b 1 | | 0 | |

* + a b See Table I for definitions.

EXAMPLE 3

The post-emergence herbicidal effectiveness of $\alpha,\beta$-dichlorocinnamic acid is further demonstrated by spraying established plants with a 1000 p.p.m. solution in 50/50 acetone/water mixture. Small flats approximately 6 inches by 10 inches containing seedling plants of radish and tomato and others containing Canada thistle, wheat and crabgrass are sprayed with the aforementioned solution, placed on a greenhouse bench and observations are recorded two weeks after spraying.

The results are presented in the following Table III.

Table III

| Test Plant | Herbitoxicity Index* (1,000 p.p.m.) active ingredient |
|---|---|
| Radish | 4 |
| Tomato | 5 |
| Canada Thistle | 4+ |
| Wheat | 0 |
| Crabgrass | 0 |

*See Table I for definition.

EXAMPLE 4

To further illustrate the pre-emergence activity of the compounds of the present invention and to observe the effectiveness of these compounds at relatively high concentrations, the following tests are performed:

Seeds of wheat, radish, ryegrass, mustard and millet are thoroughly mixed with a potting soil. Approximately one inch of each of the seed soil mixtures is planted on top of one inch of plotting soil in separate round pint cups. Herbicidal solution containing a quantity of $\alpha,\beta$-dichlorocinnamic acid equivalent to approximately 25 pounds per acre in a 50/50 acetone/water solution is applied on the soil surface in each cup previously wet by tap water. The cups are placed on greenhouse benches and the results recorded two weeks later.

Examination of the potted seeds reveals that 75% to 95% of the wheat and ryegrass and all of the radish, mustard and millet have been killed.

EXAMPLE 5

The procedure set forth in Example 3 is followed in every detail, except that the sodium salt of $\alpha,\beta$-dichlorocinnamic acid is applied to a variety of vigorously growing monocotyledonous and dicotyledonous plants. Rates of application are 4, 2, 1 and 0.5 pounds of herbicide in 86 gallons of water per acre. The results are presented in Table IV, below.

From the data obtained it can be observed that the compounds of the present invention exhibit selective postemergence activity. Further, it is clear that the compounds are effective at rates of application as low as four pounds per acre. This is evidenced by the fact that field bindweed, cotton, soybeans, pigweed, purslane, Canada thistle, bird's-foot trefoil, mustard, lamb's-quarters, alfalfa and chickweed are completely killed by the application of this herbicide at the above-mentioned rate.

Table IV

| Test Plant | Herbitoxicity Index,* rate in pounds per acre | | | |
|---|---|---|---|---|
| | 4 | 2 | 1 | 0.5 |
| Field bindweed | 5 | b 3 | 2 | 0 |
| Corn | 2 | 0 | 0 | 0 |
| Wheat | 0 | 0 | 0 | 0 |
| Cotton | 5 | 5- | b 3 | b 1 |
| Soybeans | 5 | 5 | 5 | 3 |
| Pigweed | 5 | 5 | 5 | 5- |
| Purslane | 5 | 5- | 4+ | 4+ |
| Canada Thistle | 5 | 5 | b 3 | b 3 |
| Bird's-foot trefoil | 5 | 4+ | 3 | 0 |
| Mustard | 5 | 5 | 3 | 2 |
| Lamb's-quarters | 5 | 5 | 5- | 4 |
| Alfalfa | 5 | 5 | 4 | 2 |
| Onion | 4+ | b 3 | 2 | 0 |
| Chickweed | 5 | 5- | 1 | 0 |
| Bentgrass | 1 | 0 | 0 | 0 |
| Bluegrass | 1 | 0 | 0 | 0 |

* a b See Table I for definitions.

EXAMPLE 6

The sodium salt and the methylamine salt of $\alpha,\beta$-dichlorocinnamic acid are respectively applied to a variety of plant species in accordance with the procedure of Example 4, above. Rates of application for these tests are: 4, 2, 1 and 0.5 pounds in 86 gallons of water per acre.

The results are tabularized in Table V, below.

Table V

| Test Plant | Herbitoxicity Index* | | | | | | | |
|---|---|---|---|---|---|---|---|---|
| | 4 lbs./A | | 2 lbs./A | | 1 lb./A | | 0.5 lb./A | |
| | D+ | E+ | D+ | E+ | D+ | E+ | D+ | E+ |
| Snapbean | 5 | 5 | 5 | 5 | 5 | 5 | 2 | 2 |
| Corn | 1 | 1 | 0 | 0 | 0 | 0 | 0 | 0 |
| Wheat | 1 | 1 | 0 | 0 | 0 | 0 | 0 | 0 |
| Cotton | 5 | 5 | 4 | 4 | 3 | 3 | 1 | 1 |
| Soybean | 5 | 5 | 5 | 5 | 5 | 5 | 5- | 5- |
| Pigweed | 5 | 5 | 5 | 5 | 5- | 5- | 4+ | 4+ |
| Purslane | 5 | 5 | 5 | 5 | 5- | 5- | 4+ | 4+ |
| Crabgrass | 1 | 1 | 1 | 1 | 0 | 0 | 0 | 0 |
| Bird's-foot trefoil | 5 | 5 | 5 | 5 | 5- | 5- | 4+ | 4+ |
| Mustard | 5 | 5 | 5 | 5 | 5- | 5- | 4+ | 4+ |
| Lamb's-quarters | 5 | 5 | 5- | 5- | 5- | 5- | 4+ | 4+ |
| Alfalfa | 5 | 5 | 5 | 5 | 5 | 5 | 5 | 5 |
| Onion | 5 | 5 | 5 | 5 | 5- | 5- | 5- | 5- |
| Chickweed | 5 | 5 | 5- | 5- | 3+ | 3 | 3+ | 3+ |
| Bentgrass | 5- | 5- | 3+ | 3+ | 0 | 0 | 0 | 0 |
| Bluegrass | 5- | 5- | 3+ | 3+ | 0 | 0 | 0 | 0 |

*See Table I for definition.
D+ is defined as the sodium salt of $\alpha,\beta$-dichlorocinnamic acid.
E+ is defined as the methylamine salt of $\alpha,\beta$-dichlorocinnamic acid.

EXAMPLE 7

Repeating the procedure of Example 6 above, similar results are obtained when utilizing the ethylamine, isopropylamine and t-butylamine salts of $\alpha$-bromo, $\beta$-chlorocinnamic acid.

I claim:

1. A method for the control of undesirable plant growth which comprises: applying to an area to be protected from such growth an $\alpha,\beta$-dihalocinnamic acid compound of the formula:

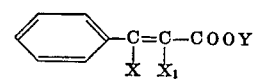

wherein X and $X_1$ stand for a halogen atom selected from the group consisting of chlorine and bromine, and Y is a substituent selected from the group consisting of hydrogen, ammonium, an alkali metal and —H·NH·lower alkyl, in an amount sufficient to effect herbicidal action.

2. A method of claim 1, which comprises: applying cis-α,β-dichlorocinnamic acid to an area to be protected from undesirable plant growth in an amount sufficient to effect herbicidal action.

3. A method of claim 1, which comprises: applying cis-α,β-dibromocinnamic acid to an area to be protected from undesirable plant growth in an amount sufficient to effect herbicidal action.

4. A method of claim 1, which comprises: applying cis-α-bromo, β-chlorocinnamic acid to an area to be protected from undesirable plant growth in an amount sufficient to effect herbicidal action.

5. A method of claim 1, which comprises: applying the sodium salt of cis-α,β-dichlorocinnamic acid to an area to be protected from undesirable plant growth in an amount sufficient to effect herbicidal action.

6. A method of claim 1, which comprises: applying the methylamine salt of cis-α,β-dichlorocinnamic acid to an area to be protected from undesirable plant growth in an amount sufficient to effect herbicidal action.

References Cited by the Examiner

UNITED STATES PATENTS

| 2,394,916 | 2/46 | Jones | 71—2.6 |
| 2,577,969 | 12/51 | Jones | 71—2.6 |
| 2,618,545 | 11/52 | Newcomer et al. | 71—2.7 |

OTHER REFERENCES

Journal Chemical Society, 1928, pages 2979 to 2985.
Plaisted: Chemical Abstracts, vol. 50, col. 17295(F), 1956.

JULIAN S. LEVITT, *Primary Examiner.*